Patented Nov. 15, 1949

2,487,882

UNITED STATES PATENT OFFICE 2,487,882

PROCESS OF PRODUCING CYANINE DYE INTERMEDIATES

Edward Bowes Knott, Harrow, England, assignor to Eastman Kodak Company, Rochester, N. Y., a corporation of New Jersey No Drawing. Application July 11, 1945, Serial No. 604,521. In Great Britain July 29, 1944

3 Claims. (Cl. 260—240)

This invention relates to improvements in the manufacture of intermediates for the production of dyes, in particular photographic sensitizing dyes. More specifically it relates to the production of β-anilinovinyl derivatives of heterocyclic nitrogen compounds.

It is known that many symmetrical carbocyanine dyes can be made by condensing a quaternary salt of a heterocyclic nitrogen compound having a methyl group attached to the carbon atom in the 2- or 4-position to the quaternary nitrogen atom with a diarylformamidine. It is also known that by suitable choice of the conditions in using a diarylformamidine, dyestuff intermediates comprising β-anilinovinyl and β-acetanilidovinyl derivatives of the quaternary salts can be made. Such intermediates will condense with another molecular proportion of the same quaternary salt or a quaternary salt of a different heterocyclic nitrogen compound containing a reactive methylene group, to give symmetrical or unsymmetrical dyes.

It is stated in British patent specification No. 412,309 that in specification No. 334,706 (as open to inspection under section 91 of the acts) it has been proposed to make polymethine dyes and intermediate products by causing a cyclic ammonium salt having a reactive methyl group, or its methylene base, to react with a compound of the general formula

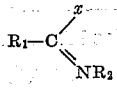

in which $x$ is a monovalent residue or substituent such as $NH_2$, Cl, O-alkyl or O-acidyl, and $R_1$ and $R_2$ are hydrogen, alkyl, aryl or aralkyl, there being obtained according to the relative proportions of the reactants, either symmetrical polymethine dyes or intermediate products which can be condensed with the same or a different cyclic ammonium salt or methylene base to produce symmetrical or unsymmetrical polymethine dyes. As compounds of the aforesaid formula are named imino-ethers, imino-esters, amidines and imino-halides; however, the use of compounds of these classes does not permit the production of unsymmetrical dyes substituted at the central carbon atom of the polymethine chain, for in the reaction between equimolecular proportions of cyclic ammonium salts and compounds of these classes in which the residue $R_1$ is alkyl, aryl or aralkyl, it has not been possible to isolate intermediate products for further condensation to an unsymmetrical dye.

Reference to the said specification No. 334,706 (as open to inspection under section 91 of the acts) shows that the wording there employed is "By action of at least 1 molecular proportion of the said compound on 1 molecular proportion of a cyclic ammonium salt or methylene base thereof, there can be obtained and separated under suitable conditions (for example in the presence of acid), generally in very good yield, an intermediate product . . ." The only condensing agent disclosed is a mixture of acetic anhydride and acetic acid and this gives rise to an acetylamino intermediate as indicated by the formulae given therein as a probable explanation of the transformations concerned. To obtain the corresponding anilinovinyl compound from this it would be necessary to hydrolyse off the acetyl group.

I have now discovered a method by which β-anilinovinyl derivatives of heterocyclic nitrogen compounds can be obtained directly in a high yield and in a high condition of purity.

I have found that an alkylisoformanilide will condense with a quaternary salt.

I have found that an alkylisoformanilide will condense with a quaternary salt of a heterocyclic nitrogen compound having at least one reactive alkyl group by merely heating them together to give the β-anilinovinyl derivative of the heterocyclic nitrogen compound directly. This result is not obtained if an acid condensing agent is used. For example, condensation of an alkylisoformanilide with such a heterocyclic compound in presence of acetic anhydride and acetic acid gives the β-acetanilidovinyl derivative; in presence of acetic anhydride alone it gives the symmetrical carbocyanine dye. Under non-acid conditions I have found that the β-anilinovinyl derivative is formed. The reagents can simply be fused together. If desired, however, they can be heated in an inert liquid such as an alcohol.

It will be seen, therefore, that under non-acid conditions the condensation gives rise to intermediates not hitherto obtained from alkylisoformanilides. We have found that this is due to a fact not hitherto realised, namely, that an alkylisoformanilide in presence of an acid is changed over quantitatively into a diphenylformamidine salt.

In carrying out the new condensations I may use not only alkylisoformanilides but compounds of the general formula.

where $R_1$ is a monovalent radical selected from the group which consists of phenyl and substituted phenyl radicals, and $R_2$ is a monovalent radical selected from the group which consists of alkyl, substituted alkyl and unsaturated aliphatic radicals.

Reactive alkyl groups in quaternary salts of heterocyclic nitrogen compounds are, as is known, methyl and methylene groups in the 2- and 4- positions to the quaternary nitrogen atom.

By my invention the β-anilinovinyl intermediates are formed directly by the condensation and are obtained in a purer state and in a higher yield than when they are formed by hydrolysis of the β-acetanilidovinyl intermediates. This may be due in part to the fact that if the condensation is carried out in presence of acetic anhydride and acetic acid (giving the β-acetanilidovinyl derivatives) a higher temperature is required than if these acid condensing agents are absent. The general formula given in the prior specifications referred to covers a wide range of compounds and could, if the substituents $R_1$, $R_2$ and X were suitably chosen, represent alkylisoformanilides; however, no examples are given therein employing isoformanilides and no alkylisoformanilides are specifically named therein. Moreover, there was no reason to believe, from the disclosure in the prior specifications referred to, that condensation would take place in the absence of a condensing agent, or indeed, except with acetic anhydride and acetic acid.

My invention enables mono- and di-β-anilinovinylpyridinium quaternary salts to be obtained in higher yield than hitherto from, for example, α- or γ-picoline quaternary salts, lutidine quaternary salts and collidine quaternary salts.

The β-anilidovinyl derivatives obtained by my invention can be used as intermediates for the manufacture of dyes. They can be acetylated for example with acid anhydrides such as acetic anhydride, to the β-acetanilidovinyl derivatives which can also be used as intermediates for dyes.

In making β-anilinovinyl derivatives with the aid of alkylisoformanilides the choice of reaction conditions most suitable to employ will be determined mainly by the reactivity of the methyl group in the quaternary salt. With substances having very reactive methyl groups such as the quaternary salts of quinaldine, 2-methylbenzthiazoles, 2-methylbenzselenazoles or 2-methylbenzoxazoles, the condensation is best carried out in a low boiling point neutral solvent such as ethyl alcohol or methyl alcohol or by fusion at a temperature less than 100° C. since fusion at high temperature, although yielding some intermediate, gives also a certain amount of dye and the fusion period is very short and difficult to control.

Basic solvents cannot be used here since this leads to dye formation. Even in neutral solvents when employing certain quaternary salts, e. g. those of 2-methylbenzthiazole or 2-methylnaphthathiazole which have extremely reactive methyl groups, the simultaneous formation of carbocyanine dye cannot be avoided although the major reaction product is the intermediate. Other substances containing methyl groups of lower reactivity condense best at higher temperatures either by fusion or by refluxing in high boiling solvents such as n-amyl alcohol, n-butyl alcohol, iso-butyl alcohol, cyclohexanol or benzyl alcohol. By using the alkyl p-toluenesulphonates of the bases the choice of solvents is greatly extended by virtue of the greater solubility and fusibility of this type of salt.

In making β-anilinovinyl derivatives of pyridinium salts, a high reaction temperature favours the yield of intermediates, e. g. whereas in ethyl alcohol the yield was of the order of 30% in pyridine the yield was about 50% and in n-amyl alcohol or by fusion at 150° C. this yield was increased over 60%. Reactive vinyl derivatives of pyridine are not formed by reacting ethyltrithioorthoformate with picoline quaternary salts and their preparation employing diphenylformamidine leads to low yields of product. If an attempt is made to prepare them by condensing alkyl-isoformanilides with picoline quaternary salts in acetic anhydride and acetic acid the reaction product is dark brown and although it may contain some β-acetanilidovinylpyridine salt the yield is low and difficult to purify.

The manner of carrying out my invention will be illustrated by the following examples, to which however, the invention is not limited.

The alkylisoformanilides employed in these examples were prepared by the method of Lander (J. C. S. 1903, 83, 417) which was found to be more convenient than that of Monier-Williams (J. C. S. 1906, 89, 274), or by the method of Claiser (Annalon 1895, 287, 365).

*Example 1.—2-β-anilinovinylquinoline ethiodide*

2.98 grams quinaldine ethiodide, 1.35 grams methyl-isoformanilide and 20 cc. ethyl alcohol were refluxed for 60 minutes. The solution turned deep yellow. On concentrating to 10 cc. and allowing it to cool the liquor deposited yellow needles which were recrystallised from alcohol M. P. 277° C.

*Example 2.—2-β-anilinovinylbenzoxazole ethiodide*

2.86 grams 2-methylbenzoxazole ethiodide, 1.35 grams methylisoformanilide and 10 cc. ethyl alcohol were refluxed for 60 minutes and concentrated. On scratching the oil, the whole crystallised. Recrystallised from alcohol-ethyl acetate it formed yellow crystals M. P. 221—222.

The anilinovinyl derivative of Example 2 was dissolved in hot acetic anhydride and allowed to cool. On adding ether, 2-β-acetanilidovinylbenzoxazole ethiodide, separated as pale yellow crystalline flocks. Recrystallised from alcohol they formed yellow needles M. P. 217° C.

*Example 3.—2-β-anilinovinylpyridine methiodide*

(a) 11.16 grams α-picoline metho-p-toluenesulphonate, 5.4 methylisoformanilide and 15 cc. n-amyl alcohol were refluxed for 90 minutes with air condenser. The solution turned deep orange red. On pouring into aqueous potassium iodide a thick yellow meal was formed. It was collected, washed free from amyl-alcohol with ether and recrystallised from boiling water forming needles M. P. 210–212° softening at 204° C. Yield 62%.

*Example 4*

The same as Example 3 but using pyridine as solvent. Yield 51%.

*Example 5*

The same as Example 3 but performing the reaction by fusion of equimolecular amounts of the quaternary salt and methylisoformanilide at 160° C. for 30'. Yield 72%.

The anilinovinyl derivative obtained in Examples 3, 4 or 5 was dissolved in a little boiling acetic anhydride, refluxed for 15 minutes and cooled. On adding ether 2-β-acetanilidovinylpyridine methiodide precipitated as an oil which rapidly solidified. Recrystallised from aqueous potassium iodide it formed pale yellow aggregates M. P. 240° C. softening at 196° C.

*Example 6.—2-β-anilinovinylpyridine ethiodide*

14.65 grams α-picoline etho-p-toluenesulphonate, 6.75 grams methylisoformanilide and 2 c. c. n-amyl alcohol were refluxed for 3 hours. The yellow-red solution was cooled and poured into aqueous potassium iodide yielding copious yellow flocks. It was collected, washed with ether and recrystallised from boiling water. It formed long orange-yellow needles M. P. 206–207° C. softening at about 200° C. Yield 54%.

*Example 7.—2-β-anilinovinylpyridine ethiodide*

Equimolecular proportions of α-picoline etho-p-toluenesulphonate and ethylisoformanilide were fused at 150° C. for 30 minutes by which time the mobile liquid has become viscous and turned red and the evolution of ethyl alcohol had ceased. It was dissolved in a little spirit and poured into aqueous potassium iodide and purified as in Example 6. Yield 58%.

On dissolving the anilinovinyl derivative obtained in Examples 5 or 6 in boiling acetic anhydride and refluxing for 15 minutes then precipitating with ether, 2-β-acetanilidovinylpyridine ethiodide thrown down was a yellow oil. By standing under ethyl acetate this slowly crystallised. It is exceedingly soluble in water or alcohol and is difficult to purify.

*Example 8.—2-β-anilinovinylnaphtha:1':2':4:5-thiazole methiodide*

Equimolecular amounts of a 2-methylnaphtha-1':2':4:5-thiazole metho-p-toluenesulphonate and methylisoformanilide were refluxed for 30 minutes in ethyl alcohol. A certain amount of carbocyanine dye crystallised out which was filtered off and the clear filtrate poured into aqueous potassium iodide. A thick greenish solid precipitated, which was collected, washed with water and recrystallised from spirit. It formed glistening pale green crystals of indefinite melting point.

*Example 9.—2-β-anilinovinyl-4:6-dimethylpyridine ethiodide*

2.4 grams 2:4:6-trimethylpyridine (collidine) and 3.7 grams methyl toluene-p-sulphonate were fused at 100° C. for 15 minutes and cooled giving a crystalline quaternary salt. 2.7 grams methylisoformanilide were added and the whole fused at 155° C. for 30 minutes. The melt turned orange-red and methyl alcohol boiled off. Hot water was added and the clear solution poured into dilute aqueous potassium iodide.

The orange solid was collected and recrystallised from alcohol forming glistening tiny orange needles with a golden reflex M. P. 253° C. Reaction is assumed to have taken place on the 2-methyl group since this is normally more reactive than the 4-methyl groups.

*Example 10.—2-β-anilinovinyl-6-methylpyridine metho-p-toluene-sulphonate*

5.35 grams of 2:6-dimethylpyridine were fused with 9.3 grams of methyl toluene-p-sulphonate at 100° C. for 5 minutes. 6.75 grams of methylisoformanilide were added and the whole reflux in 20 c. c. of n-butyl alcohol for 60 minutes. On pouring into water and added 100 c. c. of ether bright yellow crystalline flocks separated in a few minutes. Recrystallised from water they formed long flat yellow needles with a pink reflex. M. P. 234° C.

2 grams of the metho-p-toluenesulphonate of Example 10 were refluxed for 15 minutes in 5 c. c. of acetic anhydride. On adding ether 2-β-acetanilidovinyl-6-methylpyridine methoperchlorate was thrown down as an oil which crystallised on standing. The ether was decanted, the oil dissolved in water and aqueous sodium perchlorate added to complete precipitation. The pale yellow solid was recrystallised from boiling spirit-charcoal forming large flat oblong aggregates of needles. M. P. 210° C.

*Example 11.—2-β-anilinovinyl-6-methylpyridine etho-p-toluenesulphonate*

Proceeding as in Example 10 but using 10 grams of ethyl toluene-p-sulphonate and refluxing for 2 hours the etho-p-toluenesulphonate was obtained from hot water as flat orange needles. M. P. 148–150° C.

*Example 12.—2-β-anilinovinyl-4-methylpyridine methobromide*

5.35 grams of 2:4 dimethylpyridine and 9.3 grams of methyl toluene-p-sulphonate were fused at 100° C. for 10 minutes. To the viscous mass was added 6.75 grams of methylisoformanilide and 10 c. c. of isobutyl alcohol and the whole refluxed for one hour. On pouring into a mixture of aqueous potassium bromide and ether the ethobromide was obtained. Recrystallised from isopropyl alcohol it formed clusters of yellow needles. M. P. 93° C. Then resolidified and melted at 236° C., decomposition commencing at 210° C.

*Example 13.—2-β-anilinovinyl-4:6-dimethyl-pyridine metho-p-toluenesulphonate*

3 grams of 2:4:5-trimethylpyridine and 4.65 grams of methyl toluene-p-sulphonate were fused at 100° C. for 10 minutes. 3.3 grams of methylisoformanilide and 10 c. c. of n-butyl alcohol were added and the whole refluxed for 2 hours. On pouring into a water-ether mixture orange flocks were produced which were recrystallised from boiling water forming bright orange feathery needle clusters M. P. 235° C.

*Example 14.—2-β-anilinovinyl-4:6-dimethylpyridine ethiodide*

3.0 grams of 2:4:6-trimethylpyridine and 5.0 grams of ethyl toluene-p-sulphonate were fused for 30 minutes at 140° C. 3.3 grams of methylisoformanilide and 10 c. c. of n-butyl alcohol were added and refluxed for 2 hours. On pouring into a mixture of aqueous sodium iodide and ether the required substance crystallised. From spirit it formed glistening flat orange needles M. P. 265° C.

*Example 15.—2:6-di-β-anilinovinylpyridine methochloride*

2.678 grams of 2:6-dimethylpyridine and 4.65 grams of methyl toluene-p-sulphonate were fused at 100° C. for 5 minutes 6.75 grams of methylisoformanilide was added and fused at 200° C. under reflux for 30 minutes. The melt was dissolved in hot spirit and poured into aqueous sodium chloride giving a copious orange precipitate. This was collected and dissolved in hot spirit and chilled in ice water. The required substance separated as a gel consisting of fine yellow threads. The alcoholic solution fluoresces green M. P. 272° C. (decomp.).

2 grams of the dianilinovinyl-derivative of Example 15 were refluxed in 20 c. c. of acetic anhydride until dissolved, cooled and ether added slowly. The solution filled with pale yellow needles of 2:6-di-β-acetanilidovinylpyridine methochloride. This was purified by dissolving in acetic anhydride and precipitating with ether. There resulted pale yellow needles, M. P. 106–108° C., exceedingly easily soluble in alcohol or water.

*Example 16.—2:6-di-β-anilinovinylpyridine ethochloride*

Proceeding as for the methochloride of Example 15 but using 5 grams of ethyl toluene-p-sulphonate instead of the methyl derivative the product was precipitated as an oil on pouring into aqueous sodium chloride. This oil solidified on covering it with spirit. Recrystallised from spirit, it formed feathery bronze needles M. P. 240–245° C. (decomp.).

*Example 17.—4-β-anilinovinylpyridine methiodide*

1.86 grams of 4-methylpyridine and 3.72 grams of methyl toluene-p-sulphonate were fused at 100° C. for 10 minutes. 3.0 grams of ethylisoformanilide was added and fused at 165° C. for 30 minutes. The melt was dissolved in spirit and poured into aqueuos potassium iodide. On diluting with water, needles separated which were recrystallised from hot water in the form of glistening flat orange needles M. P. 196° C. with a tendency to soften at 102° C.

*Example 18.—4-β-anilinovinylpyridine ethiodide*

1.86 grams of 4-methylpyridine and 4.0 grams of ethyl toluene-p-sulphonate were fused at 140° C. for 1 hour and ethylisoformanilide added. On fusing at 165° C. for 30 minutes the melt turned deep orange-red. It was dissolved in spirit and poured into aqueous potassium iodide giving a dark red oil. After standing overnight in ice the oil solidified. It was collected and ground up with a mixture of 5 parts by weight of isopropyl alcohol and one part by weight of ice water to remove the dark colouring matter. The solid was collected and washed with the same solvent leaving orange grains on the filter. These were recrystallised by dissolving in cold water, adding aqueous potassium iodide until faintly cloudy and cooling slowly to 5° C. In this way the substance was obtained as glistening orange needles, M. P. 64–65° C.

I declare that what I claim is:

1. A method of producing 2-β-anilinovinylpyridine methiodide which comprises refluxing a mixture consisting of α-picoline metho-p-toluenesulfonate, methylisoformanilide, and n-amyl alcohol, converting the 2-β-anilinovinylpyridine metho-p-toluenesulfonate to 2-β-anilinovinylpyridine methiodide by adding the reaction mixture to aqueous potassium iodide, and recovering the 2-β-anilinovinylpyridine methiodide from the resulting mixture.

2. A method of producing 2-β-anilinovinylpyridine methiodide which comprises fusing a mixture consisting of α-picoline metho-p-toluenesulfonate and methylisoformanilide at 160° C., converting the 2-β-anilinovinylpyridine metho-p-toluenesulfonate to 2-β-anilinovinylpyridine methiodide by adding the reaction mixture to aqueous potassium iodide, and recovering the 2-β-anilinovinylpyridine methiodide from the resulting mixture.

3. A method of producing a β-anilinovinyl derivative of a pyridinium alkyl-p-toluenesulfonate which comprises heating, at a temperature of from the boiling point of n-amyl alcohol to 160° C., a mixture consisting of an alkylisoformanilide in which the alkyl group contains from 1 to 2 carbon atoms and a pyridinium alkyl-p-toluenesulfonate having a methyl group in a position selected from the group consisting of the 2- and 4-positions and in which the alkyl group contains from 1 to 2 carbon atoms, and then recovering the β-anilinovinyl compound from the reaction mixture.

EDWARD BOWES KNOTT.

REFERENCES CITED

The following references are of record in the file of this patent:

UNITED STATES PATENTS

| Number | Name | Date |
|---|---|---|
| 2,156,464 | Schulz | May 2, 1939 |
| 2,332,517 | Kendall | Oct. 26, 1943 |
| 2,425,773 | Wilson | Aug. 19, 1947 |

FOREIGN PATENTS

| Number | Country | Date |
|---|---|---|
| 334,706 | Great Britain | 1930 |
| 412,309 | Great Britain | 1934 |